United States Patent [19]

Wong

[11] Patent Number: 5,974,465
[45] Date of Patent: Oct. 26, 1999

[54] METHOD AND APPARATUS FOR PRIORITIZING THE ENQUEUEING OF OUTBOUND DATA PACKETS IN A NETWORK DEVICE

[75] Inventor: Shian-Tung Wong, Santa Clara, Calif.

[73] Assignee: 3COM Corporation, Santa Clara, Calif.

[21] Appl. No.: 09/010,432

[22] Filed: Jan. 21, 1998

[51] Int. Cl.$^6$ ............................... G06F 13/00; H04J 3/02
[52] U.S. Cl. ..................... 709/234; 709/235; 709/240; 370/230
[58] Field of Search .................... 709/103, 232, 709/233, 234, 235, 238, 240, 243, 244, 250, 300; 370/229, 230, 232, 235

[56] References Cited

U.S. PATENT DOCUMENTS

| | | | |
|---|---|---|---|
| 5,195,089 | 3/1993 | Sindhu et al. | 370/235 |
| 5,404,550 | 4/1995 | Horst | 712/14 |
| 5,634,015 | 5/1997 | Chang et al. | 710/219 |
| 5,793,747 | 8/1998 | Kline | 370/230 |

*Primary Examiner*—Viet D. Vu
*Attorney, Agent, or Firm*—Wagner Murabito & Hao LLP

[57] ABSTRACT

In a switching device coupled to a computer network, a method for enqueing data packets for transmission over the computer network according to a priority scheme. Initially, the switching device is configured to define a hierarchy of priority levels. A number of queue buffers are reserved for each of the priority levels. Furthermore, each application program is assigned a particular priority, depending its relative importance and time-criticalness. When the application program generates an outbound packet, that packet is assigned a corresponding priority. The CPU checks the number of buffers in the queue which are currently available and compares it with the sum of the buffers which were reserved for all priority levels which are higher than the priority of the outbound packet. If the number of available buffers exceeds the sum of the buffers reserved for the priority levels higher than that of the packet, then the packet is stored in the queue. Otherwise, the packet is discarded. Thereby, a subsequent higher priority packet can be preferentially stored in place of a lower priority packet which was earlier received.

20 Claims, 5 Drawing Sheets

METHOD AND APPARATUS FOR PRIORITIZING THE ENQUEUEING OF OUTBOUND DATA PACKETS IN A NETWORK DEVICE

FIELD OF THE INVENTION

The present invention relates to an apparatus and method for creating, configuring, and loading one or more logical queues according to data priorities.

BACKGROUND OF THE INVENTION

Businesses and individuals rely upon computer networks for exchanging communications and information. Computer networks have become virtually indispensable because it allows users to readily gain access to and exchange information of all types (e.g., sound, text, numerical data, video, graphics, multi-media, etc.) with other computers, databases, websites, and individuals. However, due to their usefulness and convenience, the traffic or amount of data being transmitted over the various networks is dramatically increasing. As the traffic over a network increases, it tends to decrease the network's overall response time. This is due to the fact that a network has a limited amount of data that it can carry over a given amount of time. When the amount of data to be transmitted exceeds the network's bandwidth, the network becomes overloaded, and the time or "latency" for transmitting a packet of data increases dramatically. This delay due to overcongestion on the network can be critical in some applications. For example, financial and stock market data for brokerages must be processed and kept up-to-date. Other real-time applications which are time-sensitive include on-line banking, on-line game playing, video teleconferencing, etc. Hence, when the computer network becomes too slow, it negatively impacts the effectiveness and efficiency of the personnel operating on that network.

One way to solve the congestion problem is to upgrade the network to give it increased bandwidth to make it faster. A faster, high-bandwidth network can transmit more data packets in shorter periods of time. However, this is an extremely expensive, time-consuming, and disruptive process. It often entails re-installing higher capacity lines and discarding older equipment in place of newer, faster, and more costly models. Furthermore, advanced networks are harder to maintain, service, and administer. As such, upgrades are not undertaken lightly. In the meantime, users must suffer through frustratingly slow response times. Further complicating matters is the fact that computer networks often experience heightened activity and traffic at certain peak operating times. This may result when multiple computers attempt to log onto and transmit over the network simultaneously or when an application is transmitting a very large file in a burst. It is very difficult to predict and prevent the occurrence of these traffic peaks.

In an effort to minimize the impact of the surge in traffic and to generally manage the overall traffic on the network, designers have used storage buffers to temporarily store the data packets each computer wishes to transmit. If the network is currently too busy to handle a data packet, that packet is queued into the buffers. Enqueued data packets must wait in turn until the opportunity arises for them to be sent over the network. In the meantime, the computer can perform other processing functions and does not have to wait for the packets to be successfully transmitted.

Although these queue buffers are beneficial, they still do not solve all the problems. One problem is that including these queue buffers increases the cost of manufacturing network devices. Hence, designers have calculated the optimum amount of queue buffers to implement from a cost-benefit standpoint. Given this buffer size constraint, there may be instances when the buffers are full. If the queue buffers are full, a data packet may be dropped, or the computer may have to periodically monitor the queue buffers to determine whether a slot has opened up. In either case, that data packet as well as successive data packets cannot be queued for eventual transmission over the network. As discussed above, there may be instances when it is critical to transmit certain data packets. For example, a data packet containing key network administration data should be transmitted as soon as possible. Yet, the queue buffers might be filled with data packets relating to non-critical e-mail messages. The network admininstration data must then wait until the enqueued e-mail packets are transmitted.

Thus, there is a need for some apparatus or method for creating prioritized queue buffers, whereby time-critical data packets are given preference in the enqueing process.

SUMMARY OF THE INVENTION

The present invention pertains to an apparatus and method for a switching device coupled to a computer network to enque data packets for transmission over the computer network according to a pre-determined priority scheme. Initially, the switching device is configured to define a hierarchy of priority levels. A number of queue buffers are reserved for each of the priority levels. Furthermore, each application program is assigned a particular priority, depending its relative importance and time-criticalness. When the application program generates an outbound packet, that packet is assigned a corresponding priority. The outbound packet is not automatically stored in the queue. Instead, the central processing unit checks the number of buffers in the queue which are currently available and compares it with the sum of the buffers which were reserved for all priority levels which are higher than the priority of the outbound packet. If the number of available buffers exceeds the sum of the buffers reserved for the priority levels higher than that of the packet, then the packet is stored in the queue. Otherwise, the packet is discarded. Thereby, the present invention allows a subsequent higher priority packet to be preferentially enqueued in place of a lower priority packet which was earlier received. Essentially, when the queue is nearly full, less important packets are discarded, and only those packets with the requisite degree of priority are stored in the queue buffers which were reserved.

In the currently preferred embodiment, a shared memory is segregated into a number of different areas. Each area comprises a different queue. The multiple queues correspond to multiple interface devices. An outbound packet is initially stored in a temporary staging area. The central processing unit then examines its priority to determine whether it meets the criteria for being stored in the queue. If the packet qualifies to be stored in the queue, its address is examined to determine which of the multiple queues that it should be stored into. Once the packet has been forwarded to the appropriate interface device and transmitted, its corresponding buffer is cleared and made available for another buffer by a dispatcher program. The process then repeats.

BRIEF DESCRIPTION OF THE DRAWINGS

The operation of this invention can be best visualized by reference to the following drawings.

DETAILED DESCRIPTION

An apparatus and method for creating, configuring, and loading one or more logical queues according to data priorities is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
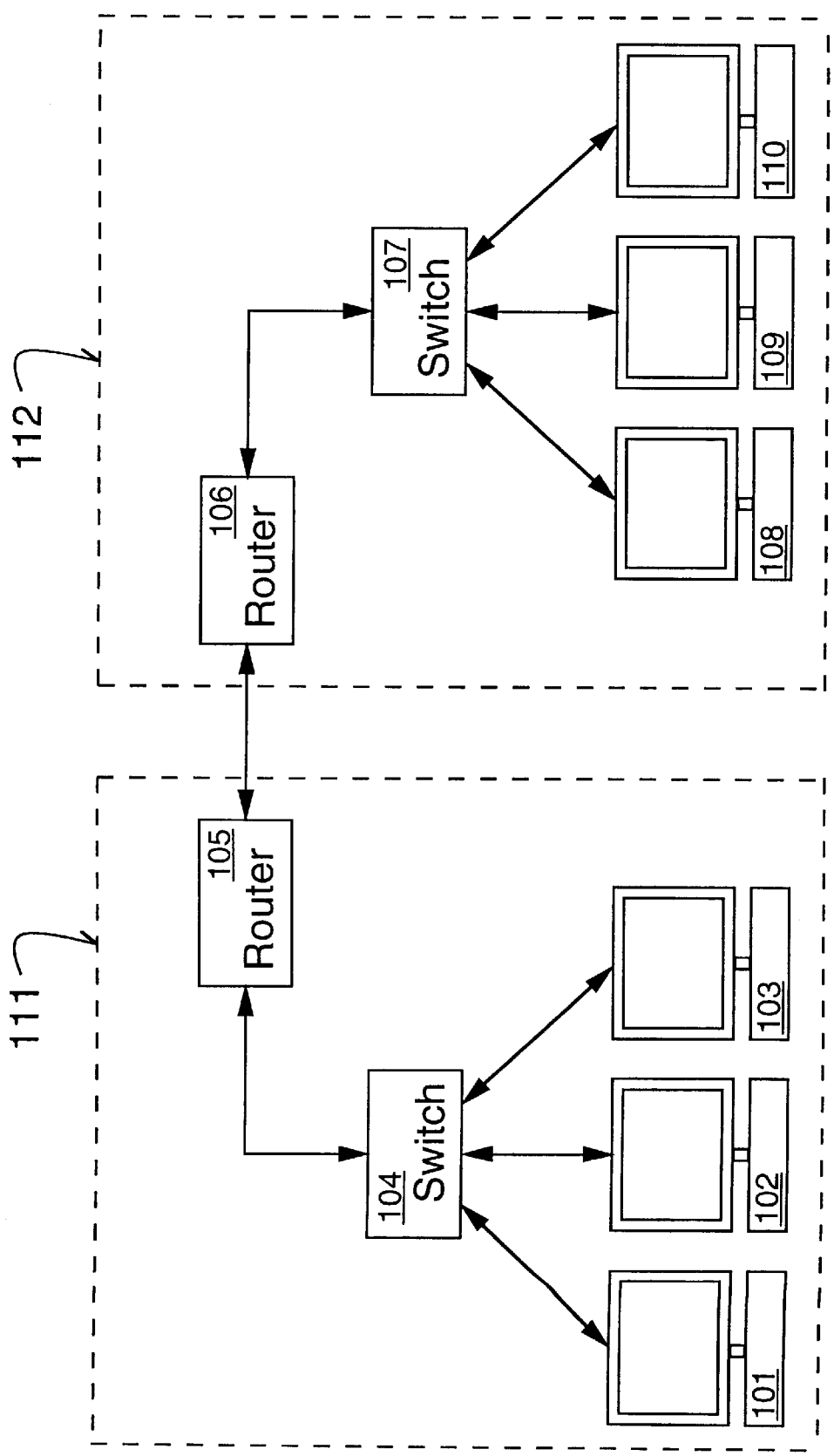
FIG. 1 shows a computer network upon which the present invention may be practiced.

Referring to FIG. 1, a computer network upon which the present invention may be practiced is shown. A number of personal computers (PC's) 101–103 are coupled to a switching device 104. Thereby, any of the PC's 101–103 belonging to subnet 111 can exchange information through switch 104 by means of resident client software (e.g., Internet Protocol). Switch 104 is a layer 2 device and can be implemented across any one of the multiple network technologies: Ethernet, Fast Ethernet, Gigabit Ethernet, Fiber Distributed Data Interface, Token Ring, and Asynchronous Transfer Mode. Similarly, another group of PC's 108–110 can be coupled together via switch 107 to form a different subnet 112. These PC's 108–110 can exchange information amongst themselves. The two subnets 111 and 112 can be coupled together to form a larger network by implementing layer 3 routers 105 and 106. The routers 105 and 106 examine the contents of data packets to determine their respective destinations and routes them accordingly. Note that there is a physical limitation as to how many packets can be transmitted over the network lines for a given time period. Hence, data packets are queued in memory before they are transmitted. In the present invention, the packets are queued in a particular priority hierarchy. The queueing mechanism and process of the present invention can reside either locally in one or more of the PC's, the switches, routers, or some other network device. Furthermore, it should be noted that there exist many different configurations, software, and hardware schemes which can be used to practice the present invention. The present invention is not limited to one particular network architecture.

Figure 2:
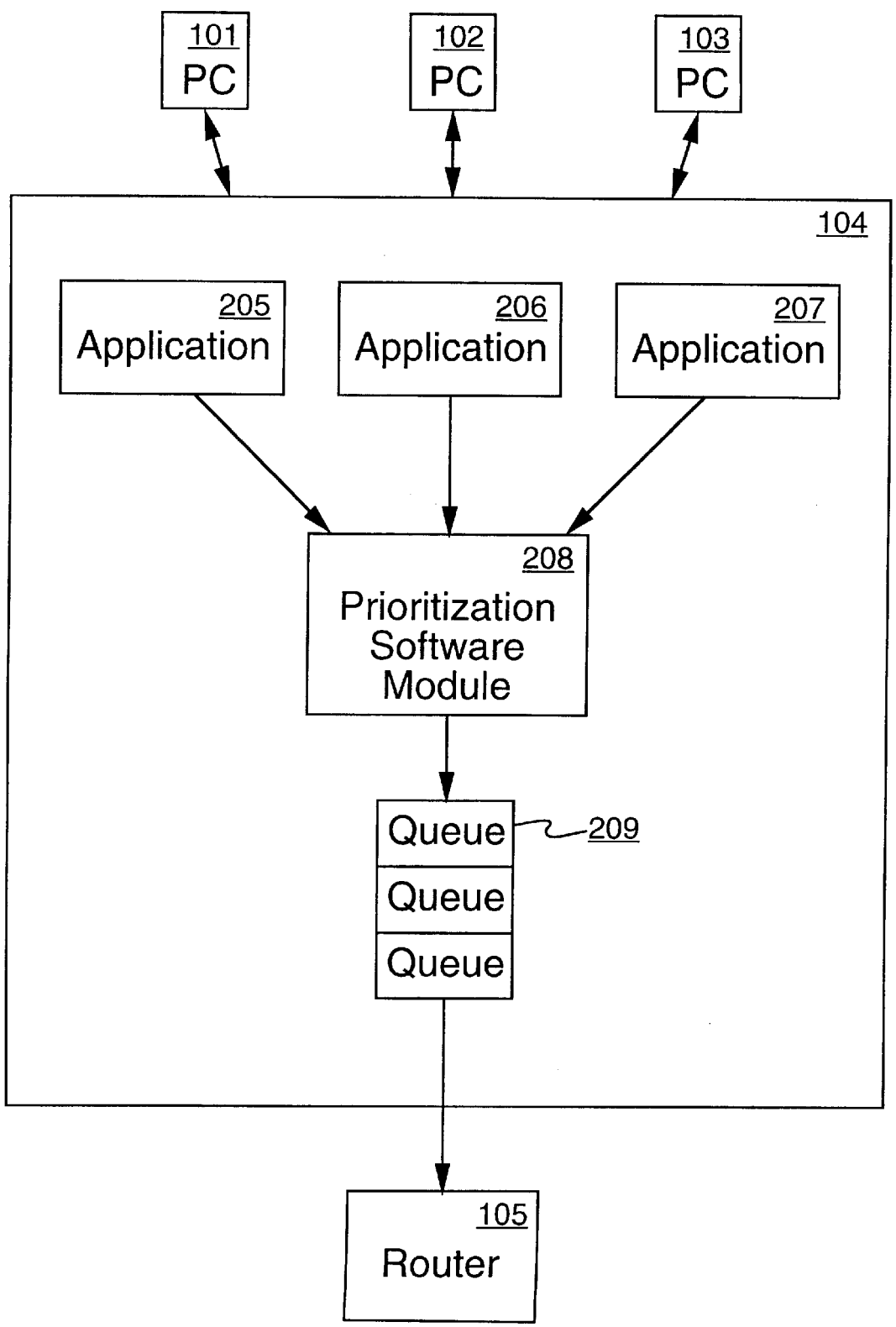
FIG. 2 shows an exemplary block diagram of the software that can be used to create, configure, and load one or more logical queues according to pre-determined packet priorities.

FIG. 2 shows an exemplary block diagram of the software that can be used to create, configure, and load one or more logical queues according to pre-determined packet priorities. One or more PC's 101–103 are coupled to network device 104. Alternatively, network device 104 may be a standalone device. Network device 104 can be either another personal computer, server, multiplexer, router, switching hub, etc. The PC's 101–103 have application programs running which forward and receive packets to/from switch 104. In addition, there may be packets which are being generated internally by one of the application programs 205–207 running on switch 104. Whenever an outbound packet is to be transmitted, prioritization software module 208 examines that packet to determine whether it should be stored in queue 209. The prioritization software module 208 makes its determination based upon a particular configuration scheme. It is the function of software module 208 to initially configure the prioritization scheme. The configuration process entails specifying a number of different priority levels. For each of these priority levels, the software module 208 specifies a number of buffers within queue 209 which are to be reserved for that particular priority level. A buffer is a discrete unit of memory which is used to store one packet. The size of the packets and buffers can vary, depending on the hardware and software considerations.

Whenever an outbound packet is to be transmitted, the software module 208 checks the queue 209 to determine how many buffers are empty or otherwise available. The software module compares this with the priority of the outbound packet. The priority of the outbound packet is assigned according to the application program which generated that particular packet. Each application program is initially assigned a priority level by the prioritization software module 208. The priority assigned is based upon the degree of importance or level of time-critical information that is being generated by that particular application. For example, application 205 might be a network administration program; application 206 might be a web browser; and application 207 might be an e-mail program. The software module would then assign the highest priority to the network administration program because it is important to monitor the network and be notified of any potential error conditions. The web browser application would be assigned a lower priority because it is not as important for the user to retrieve web pages as it is for the network administrator to manage the network. The e-mail application would be assigned the lowest priority because it often does not matter whether the e-mail message is received the next second, minute, or even hours later. The software module 208 can base its priority assignments on input from the user or network administrator. Alternatively, software module 208 can consult a stored table of applications and their default priorities.

For every packet to be transmitted, based on its priority and current buffer usage, the packet may be queued and then transmitted if the number of buffers left is greater than the sum of those configured for all higher priorities. Otherwise, the packet will be discarded, and a notification is sent. For example, assume that the highest priority is 0 and that two buffers were reserved for this priority level; the next lower priority level is 1 and three buffers were reserved for priority 1; and an even lower priority level 2 has four buffers reserved. If an outbound packet having a priority 2 were generated, it would be queued only if the current available buffers were greater than five—two for priority 0 plus three for priority 1. In other words, there must be at least five free buffers available in queue 209 before any priority 2 packet can be enqueued for transmission. Thereby, there will be at least five buffers available in case subsequent packets having a higher priority need to be transmitted. Likewise, there must be at least two free buffers before a priority 1 packet can be stored. Thus, the buffers of queue 209 will not be completely filled with low priority packets. Consequently, a higher priority packet can be equeued immediately for transmission. For instance, given the sample applications described above, the network administration application would be assigned a priority 0; the web browser would be assigned a priority 2; and the e-mail application would be assigned a priority 3. If there are at least nine buffers that are currently available, an e-mail packet would be stored in queue 209 for eventual transmission. Otherwise, the e-mail packet would be discarded. The e-mail application and/or prioritization software module 208 would be notified of this event. The e-mail application could then attempt to resend that packet at a later time. Now, if a priority 0 packet containing critical error information from the network administration application is received, it will be equeued because it has the requisite priority level and can be stored in one of the available buffers that was reserved for this type of occurrence. The error packet will be stored in queue 209 instead of the email packet, even though the e-mail packet was generated before the error packet. Hence, with the present invention, a later packet having a higher priority will get preferentially stored in the queue in favor of an earlier packet having a lower priority.

Figure 3:
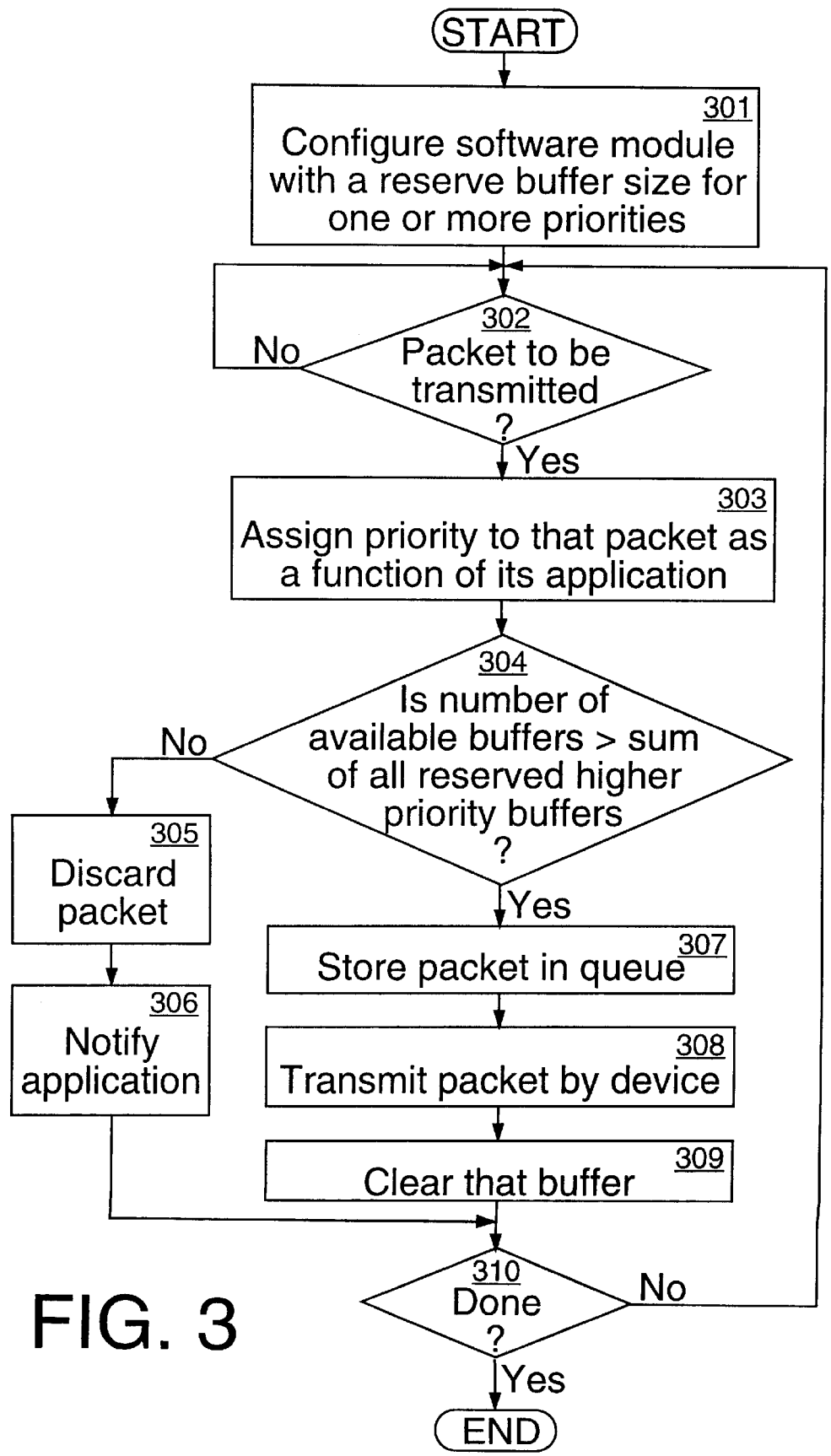
FIG. 3 is a flowchart describing the steps for performing the configuration, prioritization, and queue management process of the present invention.

FIG. 3 is a flowchart describing the steps for performing the configuration, prioritization, and queue management process of the present invention. Initially, in step 301, the software configures the queue so as to reserve a certain number of buffers for each one of one or more different priorities. Next, packets are created by application programs. When an outbound packet is created, it is detected in step 302. The new outbound packet is then assigned a particular priority as a function of its relative importance and its time-criticalness, step 303. In the currently preferred embodiment, the packet has a priority according to the application program that had created that packet. The software then determines whether the new outbound packet is to be currently stored in the queue, step 304. This determination is based on a function of the priority of the packet, the number of buffers in the queue which are currently available, and the number of buffers that were reserved for one or more priorities. If the number of available buffers exceeds the sum of all of the buffers which were reserved for priorities which are higher than the priority of the current packet, then the current packet is stored in the queue, step 307. The queue is basically a first-in-first-out (FIFO) operation, whereby the packets are transmitted sequentially, depending on when they were loaded into the queue. Eventually, the packet that was just stored in the queue is read out and transmitted over the network to its intended destination, step 308. Once the packet has been transmitted, the buffer containing that packet is now "empty" and is made available for storing another outbound packet, step 309. If all packets have been transmitted, the process ends at step 310. Otherwise, the process repeats with step 302. If, however, the number of currently available buffers does not exceed the sum of all buffers reserved for priorities which are greater than the priority of the outbound packet, then that packet is discarded and the corresponding application is notified, steps 305 and 306. Thereupon, the computer can take remedial action (e.g., retransmit the discarded packet at a later time). The process then performs step 310. Although these steps are performed in software in the currently preferred embodiment of the present invention, the process described above can just as readily be implemented in hardware with custom designed circuits, programmable logic, or ASICs.

Figure 4:
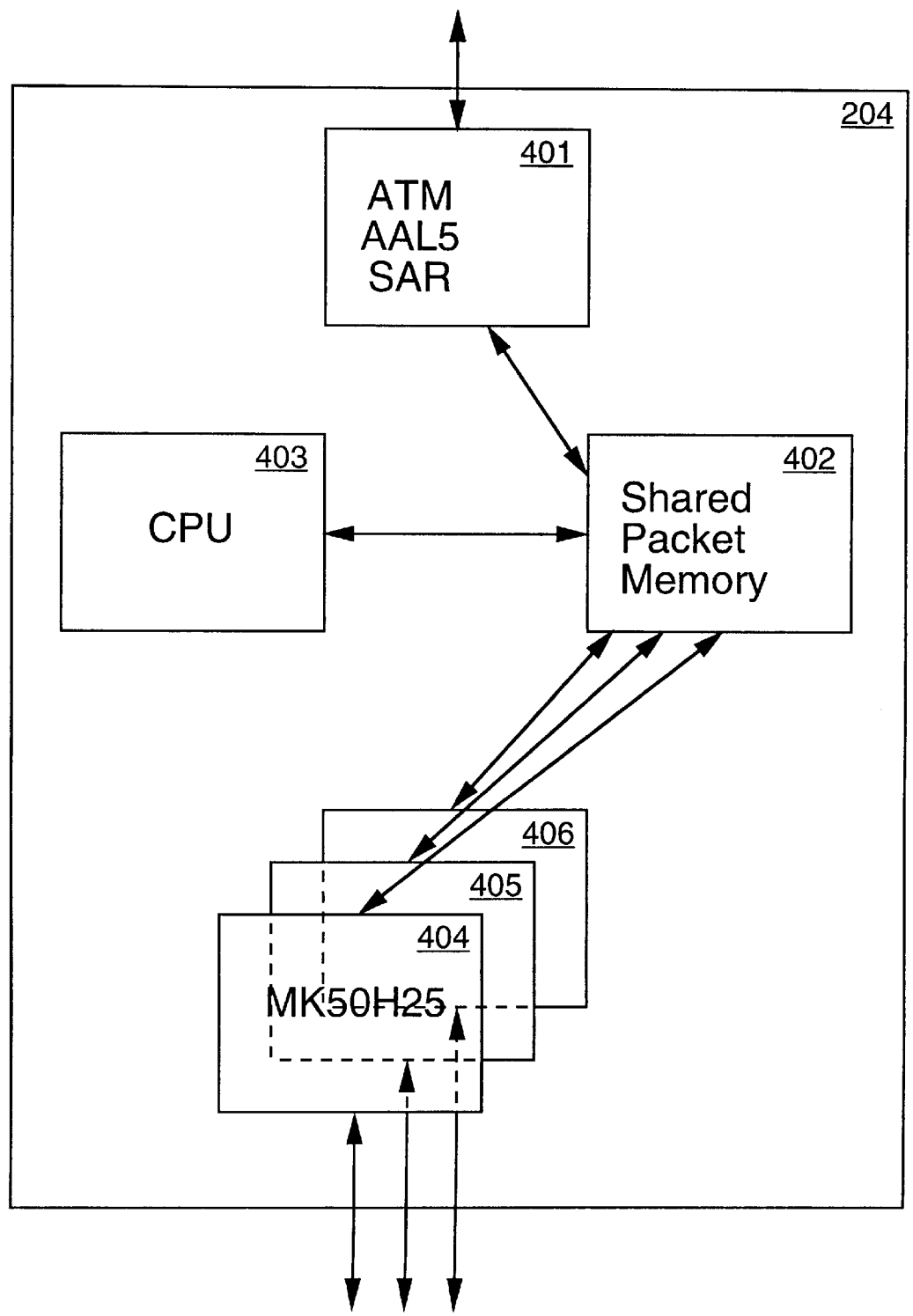
FIG. 4 is a block diagram of one exemplary hardware architecture which may be used to practice the present invention.

FIG. 4 is a block diagram of one exemplary hardware architecture which may be used to practice the present invention. Packets from one or more external devices are forwarded to network device 204. Any number of different protocols can be used. In the current implementation, the data is packetized according to an asynchronous transfer mode (ATM) format. The packets are received by the ATM Adaptation Layer 5 (AAL5) and Segmentation Assembly-Reassembly (SAR) block 401. Block 401 is a standard, off-the-shelf product and performs standard AAL5 and SAR functions. After the packets have been processed by block 401, they are individually examined by the central processing unit (CPU) 403. CPU 403 determines whether a particular packet is to be enqueued according to the prioritization process described above.

Furthermore, there can be more than one queue per switching device 204. There is one queue for each interface device, and there can be multiple interface devices. The interface device performs input/output (I/O) functions for the various packets. There can be several such interface devices within a switching device 204. Each interface device sends its packets to a different location on its own, dedicated physical line. Three such interface devices 404–406 and lines are shown. These interface devices are standard off-the-shelf products, such as the MK50H25 model number available from SGS-Thompson company of France. If there are more than one interface device, CPU 403 determines the appropriate queue to which that packet may be stored. The correct queue determination is made by examining the destination address that is encoded within the packet. Depending on where that packet is to be sent, CPU 403 selects the corresponding queue, determines how many buffers are currently available for that queue, determines the priority of the packet, and then decides whether or not that packet has enough priority for it to be stored in the queue. In the currently preferred embodiment, all the queues reside in a common shared memory 402. Memory 402 is comprised of dynamic random access memory (DRAM). The memory area is divided into a number buffers. Groups of buffers are designated into separate queues. If CPU 403 decides that the packet is to be enqueued, it is stored in the appropriate queue of shared memory 402. Eventually, packets from each of the queues of shared memory 402 are read and transmitted out through the interface devices 404–406. When a packet is transmitted, that buffer is made available for storing another packet. If CPU 403 decides that a packet cannot be stored in a queue, it informs the ATM AAL5 SAR block 401 and drops that packet.

Figure 5:
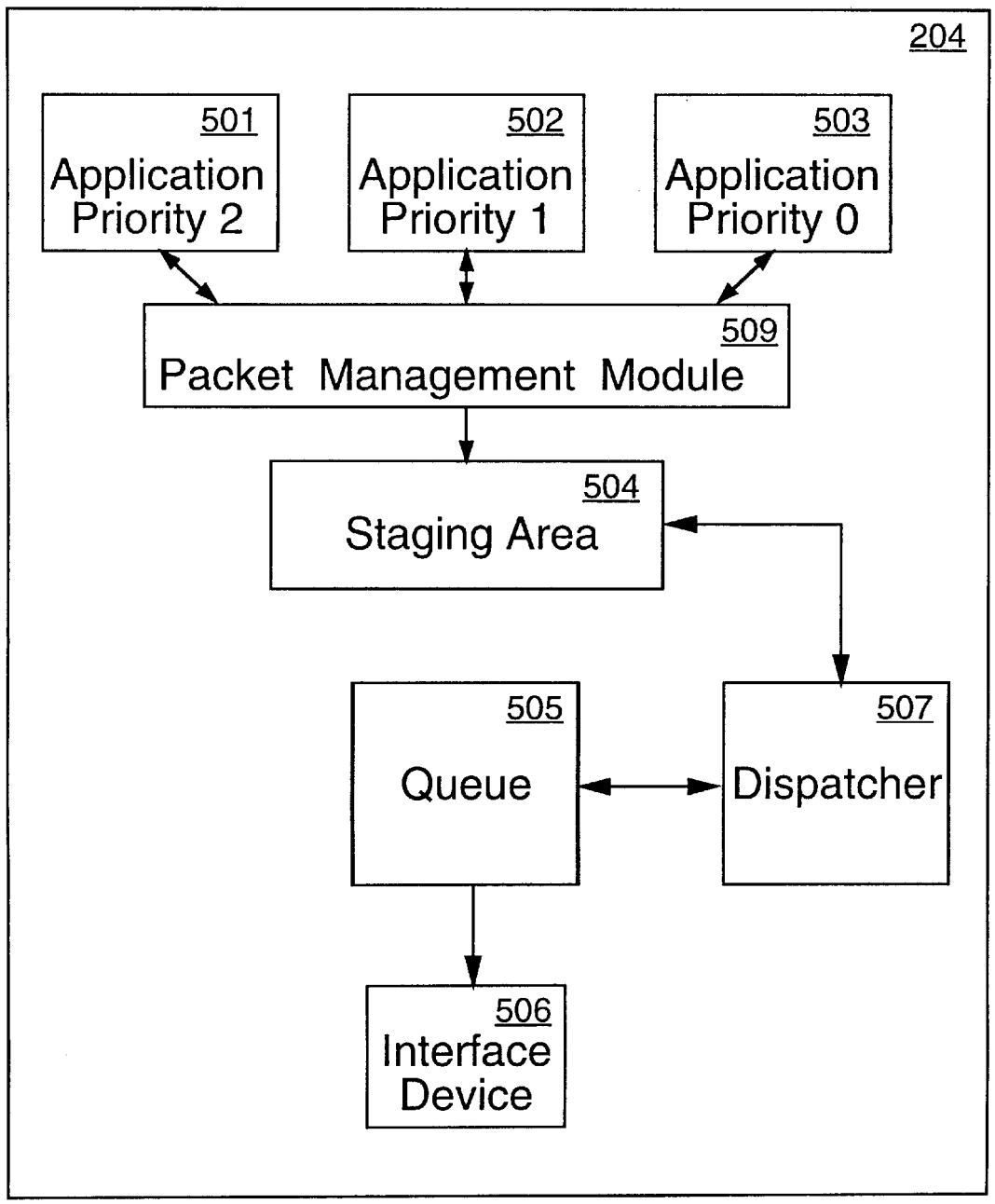
FIG. 5 shows an exemplary block diagram of the currently preferred embodiment of the present invention.

FIG. 5 shows an exemplary block diagram of the currently preferred embodiment of the present invention. Three applications 501–503 are shown. Application 501 has a level 2 priority; application 502 has a level 1 priority; and application 503 has a level 0 priority. Hence, amongst these three applications, packets from application 503 have the highest priority; packets from application 502 have the next highest priority; and packets from application 501 have the lowest priority. The packets from these three applications are initially stored in a staging area 504 by the packet management module 509. Staging area 504 is comprised of DRAM memory and is used to temporarily store new outbound packets. It also serves as an overflow reserve memory. The packet management module of block 509 configures the different priority levels and reserves a specific number of buffers in staging area 504 for each of the priority levels. The packet management module also assigns each application a priority level and stores packets in staging area based on their priority level.

For instance, application 501 was assigned a priority level of 2; application 502 was assigned a priority level of 1; and application 503 was assigned a priority level of 0. Assuming that a packet generated by application 501 preceded packets from applications 502 and 503, the packet management module examines that packet and determines that it has a priority level of 2. The packet management module then determines the number of buffers in queue 505 which are currently available. Dispatcher 507 is a piece of software which constantly tracks the status of queue 505 and checks if any buffer is available. When there is an available buffer in queue 505, the dispatcher moves the first packet of the highest priority in staging area 504 into queue 505. The packet management module stores that packet at priority level 2 area of 504. Dispatcher 507 is a piece of software which constantly tracks the status of queue 505 and checks if any buffer is available. When there is an available buffer in queue 505, the dispatcher moves the first packet of the highest priority in the staging area 504 into queue 505.

Thus, a method and apparatus for creating, configuring, and loading one or more logical queues according to data priorities has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a device coupled to a computer network, a method for enqueing data packets for transmission over the computer network according to a priority scheme, the method comprising the steps of:

defining a priority hierarchy comprised of a plurality of priority levels;

specifying a number of buffers of a plurality of buffers which comprise a queue memory which are to be reserved for each one of the plurality of priority levels;

assigning a priority to a data packet;

determining whether a number of buffers which is currently available in the queue memory is greater than a sum of all buffers which are reserved for priority levels which are higher than the priority of the data packet;

storing the data packet in the queue memory for eventual transmission over the computer network if the number of buffers which is currently available is greater than the sum of all buffers which are reserved for priority levels higher than the priority of the data packet, otherwise not storing the data packet in the queue memory if there is not enough buffers which are currently available that exceed the sum of all buffers reserved for priority levels higher than the priority of the data packet.

2. The method of claim 1 further comprising the step of assigning the priority of the data packet according to an application program which generated the data packet.

3. The method of claim 1 further comprising the step of discarding the data packet if the data packet is not stored in the queue memory.

4. The method of claim 1 further comprising the step of dividing a shared memory into a plurality of areas, each of the areas corresponding to a different queue.

5. The method of claim 4 further comprising the step of examining an address of the data packet to determine which of the plurality of queues the data packet is to be stored.

6. The method of claim 5 further comprising the step of forwarding packets from the plurality of queues to a plurality of interface devices for transmission over the computer network.

7. The method of claim 5 further comprising the step of temporarily storing data packets in a secondary storage area.

8. A network device capable of being coupled to a computer network, wherein packets of data are queued before being transmitted over the computer network according to a priority scheme, the network device comprising:

a bus;

a memory coupled to the bus for storing queued packets;

a processor coupled to the bus which assigns a priority hierarchy comprised of a plurality of priority levels for a plurality of application programs, the central processing unit also specifying an amount of memory which is to be reserved for each one of the plurality of priority levels, wherein a packet is enqueued in the memory only if an amount of memory which is currently available is greater than a sum of all memory which is reserved for priority levels which are higher than the priority of the packet;

an interface device coupled to the processor for transmitting enqueued packets in the memory over the computer network.

9. The apparatus of claim 8, wherein the processor assigns a priority to the packet according to which application program had generated the packet.

10. The apparatus of claim 8, wherein the processor discards the packet if the packet is not stored in the memory.

11. The apparatus of claim 8, wherein the memory is segregated into a plurality of areas, each of the areas corresponding to a different queue.

12. The apparatus of claim 8 further comprising a plurality of interface devices, wherein the packet is stored in a particular one of the plurality of queues and forwarded to a particular one of the interface devices according to an address contained within the packet.

13. The apparatus of claim 8 further comprising a secondary memory for temporarily storing packets before the packets are enqueued.

14. In a network device, an apparatus for enqueing data packets for transmission over a communications network according to a priority scheme, the apparatus comprising:

means for defining a priority hierarchy comprised of a plurality of priority levels;

means for specifying a number of buffers of a plurality of buffers which comprise a queue memory which are to be reserved for each one of the plurality of priority levels;

means for assigning a priority to a data packet;

means for determining whether a number of buffers which is currently available in the queue memory is greater than a sum of all buffers which are reserved for priority levels which are higher than the priority of the data packet;

means for storing the data packet in the queue memory for eventual transmission over the computer network if the number of buffers which is currently available is greater than the sum of all buffers which are reserved for priority levels higher than the priority of the data packet, otherwise not storing the data packet in the queue memory if there is not enough buffers which are currently available that exceed the sum of all buffers reserved for priority levels higher than the priority of the data packet.

15. The apparatus of claim 14 further comprising means for assigning the priority of the data packet according to an application program which generated the data packet.

16. The apparatus of claim 14 further comprising means for discarding the data packet if the data packet is not stored in the queue memory.

17. The apparatus of claim 14 further comprising means for dividing a shared memory into a plurality of areas, each of the areas corresponding to a different queue.

18. The apparatus of claim 17 further comprising means for examining an address of the data packet to determine which of the plurality of queues the data packet is to be stored.

19. The apparatus of claim 18 further comprising means for forwarding packets from the plurality of queues to a plurality of interface devices for transmission over the computer network.

20. The apparatus of claim 19 further comprising means for temporarily storing data packets in a secondary storage area.

* * * * *